United States Patent [19]

Kitahara et al.

[11] Patent Number: 5,110,886

[45] Date of Patent: May 5, 1992

[54] COMPATIBILIZING AGENT AND POLYMER BLEND COMPOSITION USING THE SAME

[75] Inventors: Shizuo Kitahara; Tetuya Toyoshima, both of Kawasaki, Japan

[73] Assignee: Nippon Zeon Co., Ltd., Tokyo, Japan

[21] Appl. No.: 650,588

[22] Filed: Feb. 5, 1991

[30] Foreign Application Priority Data

Feb. 5, 1990 [JP] Japan .................. 2-25623
Jul. 20, 1990 [JP] Japan .................. 2-192657

[51] Int. Cl.$^5$ .................. G08F 26/06; G08F 34/02
[52] U.S. Cl. .................. 526/260; 525/66; 525/92; 525/132; 526/258; 526/261; 526/265
[58] Field of Search .................. 525/92, 66; 526/260

[56] References Cited

U.S. PATENT DOCUMENTS

| | | |
|---|---|---|
| 2,897,182 | 7/1959 | Benneville et al. |
| 3,483,141 | 12/1969 | Litt et al. |
| 3,502,627 | 3/1970 | DuPont et al. |
| 3,516,944 | 6/1970 | Litt et al. |
| 4,243,769 | 1/1981 | Pritchett . |
| 4,590,241 | 5/1986 | Hohlfeld .................. 525/132 |
| 4,673,696 | 6/1987 | Tsai .................. 521/172 |
| 4,702,854 | 10/1987 | Snyder, Jr. et al. |
| 4,782,114 | 11/1988 | Perron .................. 525/66 |
| 4,840,982 | 6/1989 | Campbell .................. 524/151 |
| 4,864,002 | 9/1989 | Schuetz .................. 525/204 |
| 4,883,836 | 11/1989 | Thill .................. 525/66 |
| 4,889,889 | 12/1989 | Yates, III .................. 525/92 |
| 4,954,579 | 9/1990 | Thill .................. 525/467 |

*Primary Examiner*—Joseph L. Schofer
*Assistant Examiner*—Fred Zitomer
*Attorney, Agent, or Firm*—Sherman and Shalloway

[57] ABSTRACT

A compatibilizing agent for improving the compatibility between different polymers which are poorly compatible with each other, comprising a polymer having at least one heterocyclic ring structure containing a $>C=N^{\oplus}<$ bond in the molecule and a polymer blend composition comprising different polymers which are poorly compatible with each other and such a compatibilizing agent.

9 Claims, No Drawings

COMPATIBILIZING AGENT AND POLYMER BLEND COMPOSITION USING THE SAME

BACKGROUND OF THE INVENTION

The present invention relates to a compatibilizing agent for improving the compatibility between different polymers which are poorly compatible with each other in a polymer blend, more particularly, in a polymer blend of a nonpolar polymer and a polar polymer.

It has been a general trend in the field of polymer science and technology to try to improve the mechanical properties, moldability and the like of a polymer by blending therewith a different polymer. As is well known in the field of polymer blends, various properties of the resulting polymer blend are influenced by the compatibility of a polymer to be blended.

The blend of different polymers include blends of nonpolar polymers, blends of a nonpolar polymer and a polar polymer and blends of polar polymers. In order to improve the solubility between the component polymers in the blend, various methods have heretofore been proposed.

For example, for blends of nonpolar polymers (e.g., blends of a polyolefin such as polyethylene and polystyrene), there are known a method in which styrene/butadiene/styrene block copolymer is used as a compatibilizing agent (see U.S. Pat. Nos. 4,386,187 and 4,386,188), a method in which ethylene/vinyl acetate copolymer is used as a compatibilizing agent (see Japanese Patent Laid-Open No. 43031/1973) and the like. These methods are effective to some extent in their own way.

Further, for blends of, for example, polar polymers, there is known a method in which compatibility is improved by blending a polymer having pendant cyclic iminoether groups and a polymer having groups coreactive with the cyclic iminoether groups (see U.S. Pat. No. 4,864,002). This method is effective so far as it is applied to incompatible polymers the polar groups of which are coreactive but is ineffective when it is applied to a blend of a polymer having cyclic iminoether groups and a nonpolar polymer. Further, in the case of blends of nonpolar polymers, the addition of a polymer having cyclic iminoether groups brings about no improvement in the compatibility.

Up to date, no polymer has been found which serves as a compatibilizing agent which can improve the compatibility between different polymers, particularly between a polar polymer and a nonpolar polymer, and accordingly the development of such a compatibilizing agent is strongly desired.

SUMMARY OF THE INVENTION

Under the circumstances, the present invention has been made.

Therefore, it is an object of the present invention to provide a compatibilizing agent which is effective in improving the solubility between different polymers which are poorly compatible with each other, particularly between a polar polymer and a nonpolar polymer.

Another object of the present invention is to provide a polymer blend composition having improved compatibility, comprising different polymers which are poorly compatible with each other and a compatibilizing agent.

According to one aspect of the present invention, there is provided a compatibilizing agent for improving the compatibility between different polymers which are poorly compatible with each other, comprising a polymer having at least one heterocyclic ring structure containing a $>C=N^{\oplus}<$ bond in the molecule, and in another aspect, there is provided a polymer blend composition comprising different polymers which are poorly compatible with each other and such a compatibilizing agent.

DETAILED DESCRIPTION OF THE INVENTION

Hereafter, the present invention will be described in detail.

Heterocyclic Ring-Containing Compound

The compatibilizing agent of the present invention contains a heterocyclic ring-containing polymer having a heterocyclic ring-containing $>C=N^{\oplus}<$ a bond.

Specific examples of the heterocyclic ring-containing polymer includes those polymers represented by general formulae (1a) to (6) below.

(1) Those polymers having a heterocyclic ring of a 1,3-oxazine or 1,3-thiazine structure which has O or S and N as hetero atoms at 1,3-positions in a 6-membered ring, and N in the heterocyclic ring is in the form of a quaternary ammonium salt [(1a) to (2)]. Those polymers of which carbon-carbon double bonds in the heterocyclic ring are saturated are also included in this category.

(2) Those polymers having a heterocyclic ring of an isoxazole or isothiazole structure which has O or S and N as hetero atoms at 1,3-positions in a 5-membered ring, and N in the heterocyclic ring is in the form of a quaternary ammonium salt [(3b)]. Those polymers of which carbon-carbon double bonds in the heterocyclic ring are saturated [(3a)] are also included in this category.

(3) Those polymers having a heterocyclic ring of a 1,2-diazole structure and N at the 2-position is in the form of a quaternary ammonium salt [(4a) and (4b)]. Those compounds of which carbon-carbon double bonds in the heterocyclic ring are saturated are also included in this category.

(4) Those polymers having a heterocyclic ring of an isopyrrole structure, and N is in the form of a quaternary ammonium salt [(5a)].

(5) Those polymers having a heterocyclic ring of an oxazoline or thiaoxazoline structure which has O or S and N at the 1,3-positions in a 5-membered ring, and N in the heterocyclic ring is in the form of a quaternary ammonium salt [(6a)].

These heterocyclic ring-containing polymers include those compounds which have incorporated therein atomic groups (heterocyclic structures) represented by general formulae below in the molecule (in the molecular chain or terminals of the molecular chain)

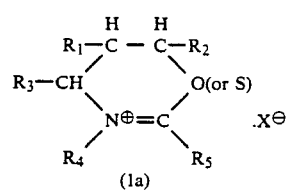

-continued

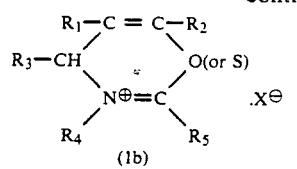
(1b)

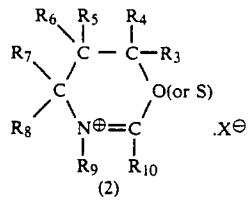
(2)

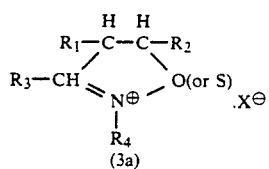
(3a)

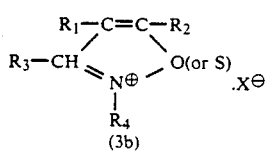
(3b)

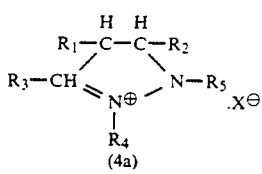
(4a)

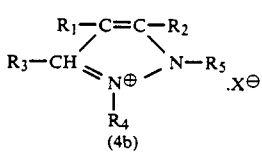
(4b)

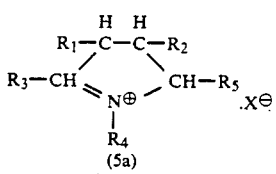
(5a)

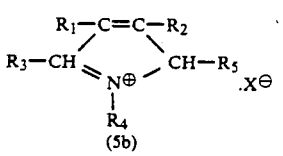
(5b)

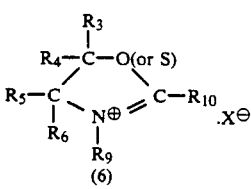
(6)

In the above formulae, $R_1$ represents a main chain of the polymer; $R_2$ represents a main chain of the polymer, a hydrogen atom or a hydrocarbon group having no ore than 6 carbon atoms; $R_3$ to $R_8$, which may be the same or different, each represent a hydrogen atom or a hydrocarbon group at least a portion of hydrogen atoms of which may be substituted by one or more substituents such as a halogen atom, a nitro group, an epoxy group, a carboxyl group and a hydroxyether group; one of $R_9$ and $R_{10}$ rerpesents a polymer chain and the other represents a hydrogen atom or a hydrocarbon group having no more than 6 carbon atoms (provided that when $R_{10}$ is a polymer chain, $R_9$ is said hydrocarbon group); and $X^\ominus$ represents an anion.

Method of Preparing the Compatibilizing Agent

As for the method of preparing the compatibilizing agent of the present invention containing a polymer having the specified heterocyclic ring structure, there can be cited (method A) a method in which a polymer is used as a starting material which has one or more carbon-carbon double bonds in the polymer (at terminal(s) of the polymer chain or in the polymer chain); (method B) a method in which a polymerizable monomer having the specified heterocyclic ring structure is copolymerized with one or more other monomers; (method C) a method in which a polymer having a precursor prior to ionization (vinyloxazine copolymer, vinyloxazoline copolymer or the like) is N-alkylated to form the specified heterocyclic ring; and the like.

(Method A)

As for the starting polymer having one or more carbon-carbon double bonds at terminal(s) of the polymer chain, there can be cited, for example, low molecular weight polymers or oligomers such as low molecular weight polyethylenes, liquid or low molecular weight polypropylenes and $\alpha$-olefin oligomers; polymers and macromers such as polybutenes, polyisobutylenes, polyethylene glycol dimethacrylates, polyethylene glycol diallylates, polypropylene glycol diallylates, polypropylene glycol dimethacrylates, polystyrene methacrylates and polystyrene allylates; and the like.

As for the starting polymer having one or more carbon-carbon double bonds in the polymer chain, there can be cited, for example, homopolymers of butadiene, isoprene, piperylene, dicyclopentadiene, ethylidene, norbornene or the like, copolymers of one or more of these monomers, copolymers of a conjugated diene with a vinyl monomer, such as polybutadiene, polyisoprene, styrene/butadiene random copolymers, styrene/butadiene block copolymers (A-B type, A-B-A type, etc. where A represents a polystyrene block, and B represents a polybutadiene block), styrene/isoprene random copolymers, styrene/isoprene block copolymers (A-B type, A-B-A type, etc. where A represents a polystyrene block, and B represents a polyisoprene block), acrylonitrile/butadiene copolymers, butadiene/propylene block copolymers, ethylene/propylene/diene monomer copolymers (EPDM), and the like, and partial hydrogenated products thereof, and the like.

The polymers which can be used as a raw material in the present invention may be any polymer that has one or more carbon-carbon double bonds at terminal(s) of the polymer chain or in the polymer chain, and the molecular weight thereof is not limited particularly and includes oligomers and even high molecular weight, solid polymers (for example, high molecular weight polymers having a weight average molecular weight on the order of several hundred thousands).

The method A for preparing the polymer having the specified heterocyclic ring structure of the present invention is not limited particularly but includes various methods, representative examples of which are exemplified below.

(1) First example is a method in which an organic compound (I) represented by general formula (I)

$$Y_1-CH=N-Y_2 \qquad (I)$$

wherein $Y_1$ and $Y_2$ each represent an organic atom group, and an organic acid halide are reacted with the abovedescribed polymer having one or more carbon-carbon double bonds in the polymer in the presence of a Lewis acid (see U.S. Pat. No. 4,677,153).

More particularly, the organic compound (I) is a compound in which $Y_1$ and $Y_2$ each represent an aliphatic, alicyclic or aromatic radical which may have an atom group such as an alkoxyl group, a cyano group, a carboxyl group or a dialkylamino group. Specific examples of such compound include benzylidenemethylamine, benzylidenebutylamine, benzylideneaniline, benzylidenecyclohexylamine, propylideneaniline, ethoxybenzylidenebutylamine, 4-carbomethoxybenzylidenebutylaniline, benzylidene-4-cyanoaniline, dimethylaminobenzylidenebutylaniline and the like.

Specific examples of the organic acid halide include acetyl chloride, acetyl bromide, benzoyl chloride, acrylic chloride, carbomethoxybenzoyl chloride, cinnamic chloride, methacrylic chloride and the like.

As the Lewis acid, there can be cited, for example, $BF_3$, $BF_3O(C_2H_5)_2$, $AlCl_3$, $TiCl_4$, $SnCl_4$, $SbCl_5$, $AgBF_4$ and the like.

Reaction conditions are not limited particularly but usually reactions may be performed at 20 to 80° C. for about 1 to about 2 hours in an inert solvent such as benzene, toluene, cyclohexane or the like. The amounts of the organic compound (I) and of the organic acid halide used are usually about 1 to about 1.5 moles per mole of the polymer having lower molecular weight. The Lewis acid is used in an amount of about 0.1 to 1 mole per mole of the organic acid halide. In the case where the polymer is a polymer having higher molecular weight, the amounts of the organic compound (I) and of the organic acid halide used are each about 0.1 to 30 parts by weight per 100 parts by weight of the polymer.

(2) Second example is a method in which an N-hydroxymethylamide compound (N-methylol compound) is reacted with the above-described polymer having one or more carbon-carbon double bonds in the polymer in the presence of a Friedel-Crafts catalyst, and further an alkyl halide or methyl p-toluenesulfonate, dimethyl sulfate or the like are reacted therewith to effect N-alkylation.

The N-hydroxymethylamide compound is a reaction product between an amide compound and an aldehyde compound. As the aldehyde compound, there can be used, for example, aliphatic and aromatic aldehydes such as formaldehyde, butyroaldehyde, valeroaldehyde and the like. As the amide compound, there can be cited, for example, acetamide, benzamide, methoxybenzamide, nitrobenzamide, N-methylbenzamide, butyramide, phthalamide, glutaric acid amide and the like. Copolymers containing N-methylolacrylamide monomer as one component and the like can also be used as the N-hydroxylmethylamine compound.

As the alkyl halide, there can be used mainly benzyl bromide, benzyl chloride, bromohexane, bromopropane, 2-chloroethyl ether, chloromethyl ether, chloropentane and the like.

As the Friedel-Crafts catalyst, those generally known in the art may be used. Representative examples thereof are metal halides or semi-metal halides, for example, halides or organic halogenated compounds of various elements such as B, Al, Si, P, Ti, V, Fe, Zn, Mo, Sn, Sb, Te and W or of oxygen-element compounds such as PO, $SO_2$ and VO, or complexes of these.

More specifically, there can be cited, for example, $BF_3$, $BF_3O(C_2H_5)_2$, $BCl_3$, $AlCl_3$, $TiCl_4$, $SnCl_4$, $FeCl_3$, $WCl_6$, $POCl_3$ and $(C_2H_5)_3Al$.

Reaction conditions are not limited particularly [for particulars of the reaction, reference is made to, for example, C. Giordano et al; *SYNTHESIS*, 92 (1971)].

(3) Third example is a method in which after subjecting the above-described polymer having one or more carbon-carbon double bonds in the polymer to a reaction with nitrile oxide, nitrileimine or nitrilylide which reaction is known as 1,3-dipole addition reaction, the product is further reacted with an alkyl halide, dimethyl sulfate or the like to effect N-alkylation.

The 1,3-dipole addition reaction is reported in detail in Huisgen; *Angew. Chem.*, 75, 604 (1963). The reaction of introducing an isoxazoline ring with nitrile oxide is disclosed in Tada, Numata et al.; *J. Soc. Rubber Industry, Japan*, 43, 996 (1970). The reaction of introducing a pyrazoline ring with tolylimine is disclosed in Caraculacu et al.; *Polym. Lett.*, 6, 451 (1968).

(4) Fourth example is a method in which the above-described polymer having one or more carbon-carbon double bonds in the polymer is reacted with a halohydroxyimino compound in the presence of a dehydrochlorinating agent such as anhydrous sodium carbonate and the product is further reacted with an alkyl halide, dimethyl sulfate or the like to effect N-methylation.

The hydroxyimino compound can be obtained by the method described in T. L. Gilchrist et al.; *J. Chem. Soc. Chem. Commun.*, 1090 (1979), i.e., a method in which an α-haloaceto compound is reacted with hydroxylamine hydrochloride, the method described in K. A. Ogloblin et al.; *J. Org. Chem.*, U.S.S.R., 1, 1370 (1965), i.e., a method in which a vinyl compound such as acrolein, an acrylate or α-methylstyrene is reacted with nitrosyl chloride.

By the above-described methods, the carboncarbon double bonds in the polymer are modified to thus introduce a heterocyclic ring structure having a $>C=\overset{\oplus}{N}<$ bond in the polymer. The polymer may if desired be partially unmodified.

The heterocyclic ring may be substituted with a substituent such as a halogen atom, a nitro group, an epoxy group, a carboxyl group, a hydroxyether group or the like in at least a portion thereof.

Method B

This is a method in which a monomer having an oxazinium or oxazolinium ion structure in the molecule is polymerized singly or together with a monomer copolymerizable with this monomer.

As the polymerizable monomer having an oxazinium ion structure in the molecule, there can be cited, for example, N-methyl-2-vinyl-2-oxazinium salt, N-methyl-2-isopropenyl-2-oxazinium salt, N-methyl-2-vinyl-4-methyl-2-oxazinium salt, N-methyl-2-isopropenyl-4-methyl-2-oxazinium salt, and the like.

As the polymerizable monomer having an oxazolinium ion structure in the molecule, there can be cited, for example, N-methyl-2-vinyl-2-oxazolinium salt, N-methyl-2-isopropenyl-2-oxazolinium salt, N-methyl-2-vinyl-4-methyl-2-oxazolinium salt, N-methyl-2-isopropenyl-4-methyl-2-oxazolinium salt, and the like.

The monomer which can be used together with these monomers, if desired, are not limited particularly so far as it is copolymerizable with these monomers and there can be used, for example, styrene type monomers such as p-methylstyrene and p-methoxystyrene; acrylic or methacrylic acid type monomers such as acrylic acid, emthylacrylate, butyl acrylate, stearyl acrylate, methacrylic acid and methyl methacrylate; ethylene, propylene, vinyl chloride, vinyl acetate, acrylamide, acrylonitrile, N-vinylpyrrolidone and the like. These monomers can be used singly or two or more of them can be used in combination.

As the polymerization initiator used in the polymerization, oil-soluble peroxide or azo type polymerization initiators which are usually used may be employed. For example, there are used peroxide type initiators such as benzoyl peroxide, lauroyl peroxide, methyl ethyl ketone peroxide, cumene hydroperoxide and t-butyl hydroperoxide; and azo type initiators such as 2,2-azobisisobutyronitrile, 2,2-azobis(2,4-dimethylvaleronitrile), 2,2-azobis-2,3,3-trimethylbutyronitrile, 1,1-azobis(cyclohexane-1-carbonitrile), 4,4-azobis-4-cyanovaleric acid and dimethyl 2,2-azobisisobutyrate. It is preferred to use the polymerization initiator in an amount of 0.05 to 10% by weight based on total weight of the polymerizable monomer(s).

The polymerization solvent used includes, for example, acetonitrile, nitromethane, toluene, benzene, xylene and the like. The polymerization is carried out at a temperature of usually −20 to +150° C., preferably 0 to +120° C.

Method C

The polymer having an oxazolinium or oxazinium ion structure can e obtained by polymerizing a monomer having an oxazoline or oxazine group in the molecule singly or together with a monomer copolymerizable with the monomer having the specified structure and then converting N-atom in the specified group in the polymer into a quaternary ammonium ion, for example, by alkylation.

As the monomer having an oxazine group in the molecule, there can be cited, for example, 2-vinyl-2-oxazine, 2-isopropenyl-2-oxazine, 2-vinyl-4-methyl-2-oxazine, 2-isopropenyl-4-methyl-2-oxazine and the like.

As the monomer having an oxazoline group in the molecule, there can be cited, for example, 2-vinyl-2-oxazoline, 2-isopropenyl-2-oxazoline, 2-vinyl-4-methyl-2-oxazoline, 2-isopropenyl-4-methyl-2-oxazoline and the like.

The monomer copolymerizable with the above-specified monomers, polymerization initiator, polymerization conditions and the like are the same as the method B above. The polymerization can also be carried out using anion polymerization catalysts usually employed.

The quaternary ammonium salt formation of the oxazine or oxazoline group in the polymer thus obtained can be achieved, for example, by alkylating N-atom in the group. In the alkylation reaction, there can be used an N-alkylating agent such as an alkyl halide, methyl p-toluenesulfonate or dimethyl sulfate. While oxazinium ions or oxazolinium ions can be introduced in the polymer chains by the above method, it may also be possible that a portion of the functional group included in the polymers have no such ion therein.

The polymer thus obtained has a molecular weight similar to that of the polymers obtained by the above-described other method.

Besides the above-described methods, there can also be used a method in which a 2-oxazoline such as 2-oxazoline, 2-methyl-2-oxazoline, 5-methyl-2-oxazoline or the like is cationically polymerized and the polymerization reaction is stopped with a nucleophilic solvent to obtain a polymer having oxazolinium ions at the terminals thereof; a method in which a 2-oxazoline is polymerized using a polymer having a proton-donating group such as a halogen atom, a sulfoxyl group or the like at a cationic polymerization medium; etc. However, the present invention is not limited thereto.

The compatibilizing agent of the present invention thus obtained has at least one heterocyclic ring described above in the polymer. The content of the heterocyclic ring varies depending on the molecular weight of the polymer but usually the ratio of (weight average molecular weight)/(number of heterocyclic ring in one polymer molecule) is no more than 200,000, preferably no more than 100,000, and more preferably no more than 10,000. However, if the ratio is no more than 1,000, the effect of the compatibilizing agent is saturated or insufficient.

The polymer which constitutes the compatibilizing agent of the present invention is not limited particularly but it is desirable to select polymers which have compositions such that their solubility parameter (SP) is close to the solubility parameter of the polymer which is incompatible with the polar polymer contained in the polymer blend composition.

The compatibilizing agent of the present invention exhibits no effect of improving the compatibility between different polymers poorly compatible with each other when the polymers are both nonpolar polymers, but exhibits remarkable effect of improving the compatibility between different polymers poorly compatible with each other when one of the polymers is a polar polymer and the other is a polar polymer having a poorer polarity than the former or a nonpolar polymer.

The amount of the compatibilizing agent used is not limited particularly and may vary depending on the polymer components to be blended. Usually, it is used in an amount within the range of 1 to 100% by weight, preferably 5 to 30% by weight, based on total weight of the polymers blended.

The polymer blend composition includes different polymers which are poorly compatible with each other and a compatibilizing agent. Of the different polymers, first polymer component is a polar polymer, and second polymer component is a polar or nonpolar polymer which is incompatible (completely incompatible or poor in compatibility) with the first component polymer.

As the first component, there can be cited, for example, addition polymers containing one or more atoms such as oxygen, sulfur, nitrogen or halogen, halogen-containing addition polymers and the like. These atoms exist in the polymer as polar groups such as a carboxyl group, a dithiocarboxyl group, a thiocarboxyl group and metal salt groups thereof; acid anhydride group, acyl halide groups, a hydroxyl group, a thiol group, an ester group, a thioester group, an ether group, a thioether group, an amino group, an amide group, an imide group, an ammonium salt group, an isocyanate group, an urethane group, a sulfonyl halide group.

Hereafter, such a polar polymer is exemplified.

As the carboxyl group-containing polymer, there can be used homopolymers of unsaturated carboxylic acids, copolymers of unsaturated carboxylic acids with monomers copolymerizable therewith, carboxy-modified polymers and the like, such as styrene/maleic anhydride copolymers, polyacrylic acids, ionomers, and carboxyl group-containing synthetic rubbers (for example, acrylic rubber VAMAC produced by Du Pont de Nemours, NBR NIPOL 1072J produced by Nippon Zeon Co., Ltd., terminal carboxyl group-containing styrene/butadiene block copolymers, carboxy-modified EPDM, etc.).

As the hydroxyl group-containing polymer, there are cited, for example, polyvinyl alcohols, polyvinyl butyral, partially ketonized ethylene/vinyl acetate copolymers, and the like.

The ester group-containing polymer includes acrylic resins such as polymethyl methacrylates and copolymers of methyl methacrylate with acrylates, polycarbonates obtained by condensation polymerization between bisphenol A and phosgene, polycarbonates obtained by interesterification reaction between bisphenol A and diphenyl carbonate, condensation polymerizate between an aromatic dicarboxylic acid and a diol, (for example, polyethylene terephthalate, polybutylene terephthalate, p-oxybenzoyl type polyesters, etc.), thermotropic liquid crystal polymers obtained from aromatic dicarboxylic acid/aromatic diol and the like, polyallylate resins, ring-opening polymerizates of cyclic lactones (for example, β-propionolactone, ε-caprolactone, etc.), cellulose derivative resins (for example, cellulose propionate, cellulose acetate, etc.), and the like.

As the thioether-containing polymer, there can be used, for example, polyphenylene oxide (PPO) and modified products thereof, polyphenylene sulfides, acetal resins (for example, polyoxymethylene, formaldehyde/α-olefin copolymers, etc.), and the like.

The amide group-containing polymer includes aliphatic polyamides (for example, nylon-6, nylon-66, nylon-610, nylon-612, nylon-11, nylon-12, nylon-6/nylon-66 copolymers, nylon-6/nylon-12 copolymer the like.

The imide group-containing polymer includes polyoxydiphenylene/pyromellitimide, polyaminobismaleimide and the like.

As the urethane group-containing polymer, there can be used thermoplastic polyurethane (for example, ESTANE produced by B. F. Goodrich, PELETHANE produced by Upjohn, DESMOPAN produced by Bayer, etc.), and the like.

As the halogen-containing polymer, there can be cited, for example, polyvinyl chlorides, polyvinyldiene chlorides, vinyl chloride/vinylidene chloride copolymers, chlorinated polyethylenes, chloroprene rubber, epichlorohydrin type rubbers, fluororubbers (for example, fluorovinylidene type copolymers, tetrafluoroethylene/propylene copolymers, tetrafluoroethylene/perfluoromethyl vinyl ether copolymers etc.), chlorinated butyl rubbers, brominated butyl rubbers, and the like.

The other polar polymers include chlorosulfonated polyethylenes, polyvinyl acetates, ethylene/vinyl acetate copolymers, polysulfones (condensation polymerizate between bisphenol A and dichlorodiphenylsulfone), polyethersulfones (for example, VICTREX produced by ICI), ABS, acrylonitrile/styrene type resins, acrylonitrile/butadiene copolymers, and the like.

Needless to say, these polymers are required to have a molecular weight or a melting point if the polymer is crystalline which are enough to satisfy necessary performances such as processability and strength. The polymers may be either resinous or rubbery, and may be selected properly depending on the purpose for which the polymer blend composition is used.

The second polymer component in the composition of the invention is not limited particularly so far as it is a nonpolar polymer which is incompatible with the first polymer component described above. The different polymers to be blended may be mutually incompatible polymers both of which belong to the first polymer component. As the polymer which is incompatible with the first polymer component described above, there can be cited, for example, polystyrenes, high-impact polystyrenes, polyethylenes, polypropylenes, ethylene/propylene copolymers, poly-4-methyl-pentene-1, polybutene-1, butyl rubbers, EPDM polybutadienes, polyisoprenes, styrene-butadiene copolymers (random copolymers, block copolymers of A-B type, A-B-A type and the like), styrene/isoprene copolymers (random copolymers, block copolymers of A-B type, A-B-A type and the like), polyisobutylenes, polybutene type resins and the like. Needless to say, these polymers are required to have a molecular weight or a melting point if the polymer is crystalline which are enough to satisfy necessary performances such as processability and strength. The polymers may be either resinous or rubbery, and may be selected properly depending on the purpose for which the polymer blend composition is used.

In the polymer blend composition of the present invention, combination of component polymers is not limited particularly and may be selected optimally depending on the purpose for which the composition is used. The component polymers may be used singly or as mixtures of two or more of them. Further, proportion in which the component polymers are blended is not limited particularly and may be determined so that the resulting composition can meet the purpose for which it is used and performances required. Usually, the first and second polymer components occupy 95 to 5% by weight and 5 to 95% by weight, respectively (based on total weight of the polymer components).

The polymer blend composition of the present invention can be prepared using a mixing machine usually used in blending polymers such as a mixing roll, a Banbury mixer, an internal mixer, a kneader, an extruder or the like. The compatibilizing agent of the present invention may be added together when different polymers are blended or mixed with a polar polymer after mixing with a polymer component having a poorer polarity in advance.

Various compounding additives may be added to the polymer blend composition of the invention so far as they do not impair the characteristics of the composition. The type and amount of the compounding additives may be determined depending on the purpose for which the composition is used and is not limited particularly in the present invention.

The compatibilizing agent of the present invention is remarkably effective in compatibilizing different polymers which are poorly compatible with each other as compared with the conventional compatibilizing agents such as styrene/butadiene block copolymers. Particularly, the compatibilizing agent of the invention exhibits excellent effects in improving the strength characteristics such as impact resistance, mechanical strength and bending resistance of polymer blend compositions which comprise a polar polymer having carbonyl bonds such as a carboxyl group, an ester group, a urethane group or an amide group or a polar polymer having an amino group and a nonpolar polymer.

Hereafter, the present invention will be explained in greater detail by examples. In examples and comparative examples, parts and percentages (%) are all by weight unless otherwise indicated specifically. Weight average molecular weights are values obtained by calibration using a standard polystyrene having a known molecular weight measured by GPC.

Synthesis Example 1 of Compatibilizing Agent

In a polymerization vessel under nitrogen atmosphere were charged a cyclohexane solution containing 10 parts by weight of butadiene and 0.09 part by weight of n-butyllithium was added thereto. After polymerizing the mixture at 70° C. for 1 hour, a cylcohexane solution containing 90 parts by weight of styrene was added to the reaction mixture and polymerization reaction was continued at 70° C. for 2 hours. Thereafter, the polymerization reaction was stopped by adding methanol. The resulting polymer was separated from the polymer solution thus obtained by solidifying with methanol and then dried to obtain a styrene/butadiene block copolymer (weight average molecular weight: 100,000).

The block copolymer (100 g) and 500 ml of benzene were charged in a vessel equipped with a stirrer, an inner heater, a steam condenser and a liquid-solid supply inlet port. Reagents A and B shown in Table 1 were added and the resulting mixture was allowed to react for about 1 hour. Further, Reagent C shown in Table 1 was reacted optionally. After, completion of the reaction, the reaction mixture was poured into 2 liters of methanol to completely solidify the reaction product. The precipitate thus obtained was dried in a vacuum dryer.

The compatibilizing agent A and B thus obtained were used in the following examples.

TABLE 1

|  | Compatibilizing Agent A | Compatibilizing Agent B |
| --- | --- | --- |
| Reagent A | Benzylidenebutylamine acetyl chloride | Hydroxymethyl-benzamide |
| Amount | 18.5 mM | 18.5 mM |
| Reagent B | Tin tetrachloride | Boron trifluoride ether complex |
| amount | 15.0 mM | 18.5 mM |
| Reagent C | — | Methyl p-toluene-sulfonate |
| Amount | — | 22.0 mM |

Synthesis Example 2 of Compatibilizing Agent

In a three-necked flask were charged 100 g of polyisobutylene (weight average molecular weight: 100,000) and 500 ml of cyclohexane. The temperature was elevated up to 50° C. while stirring. Reagents A and B shown in Table 2 were added thereto and the resulting mixture was allowed to react for about 1 hour. Further, Reagent C shown in Table 2 was reacted optionally. After completion of the reaction, the reaction mixture was poured into 2 liters of methanol to completely solidify the reaction product. The precipitate thus obtained was dried in a vacuum dryer.

The compatibilizing agent C and D thus obtained were used in the following examples.

TABLE 2

|  | Compatibilizing Agent C | Compatibilizing Agent D |
| --- | --- | --- |
| Reagent A | Benzylidenestearylamine benzoyl chloride | Benzoylhydroxamyl acid chloride |
| Amount | 20 mM | 25 mM |
| Reagent B | Titanium tetrachloride | Triethylamine |
| amount | 20 mM | 30 mM |
| Reagent C | — | Dimethyl sulfate |
| Amount | — | 36 mM |

Synthesis Example 3 of Compatibilizing Agent

In a three-necked flask were charged 100 g of ethylene/propylene/ethylidenenorbornene copolymer (weight average molecular weight: 120,000) and 500 ml of toluene. The temperature was elevated up to 50° C. while stirring. Reagents A and B shown in Table 3 were added thereto and the resulting mixture was allowed to react for about 1 hour. Further, Reagent C shown in Table 3 was reacted optionally. After completion of the reaction, the reaction mixture was poured into 2 liters of methanol to completely solidify the reaction product. The precipitate thus obtained was dried in a vacuum dryer.

The compatibilizing agents E and F thus obtained were used in the following examples.

TABLE 3

|  | Compatibilizing Agent E | Compatibilizing Agent F |
| --- | --- | --- |
| Reagent A | Benzylidenemethylamine propinylchloride | Hydroxymethylthio-benzamide |
| Amount | 13 mM | 15 mM |
| Reagent B | Antimony pentachloride | Tin tetrachloride |
| amount | 13 mM | 15 mM |
| Reagent C | — | Benzyl chloride |
| Amount | — | 18 mM |

Synthesis Example 4 of Compatibilizing Agent

In a flask equipped with a stirrer, an inlet pipe for $N_2$ gas, a reflux condenser and a thermometer were charged 200 parts of toluene having dissolved therein 3 parts of N-methyl-isopropenyloxazolinium tosylate and 97 parts of styrene. Further, 10 parts of benzoyl peroxide were added. While blowing $N_2$ gas therein, the reaction mixture was heated to 80 to 100° C. and stirred in this state for 5 hours for polymerization. After cooling the reaction mixture down to room temperature and removing the solvent by evaporation, the reaction mixture was poured into 500 ml of methanol to solidify the product, followed by drying to obtain a polymer having an oxazolinium ion structure as a functional group (weight average molecular weight: 42,000).

A portion of the polymer thus obtained was dissolved in chloroform and the resulting solution was used for measuring ultraviolet-visible light spectra of the polymer component by means of GPC to which is connected an ultraviolet-visible light multi-wavelength spectrophotometer (MULTI-330 produced by Nippon Bunko Co., Ltd.). As a result, absorption was obtained at UVmax=310 nm which is deemed to be assigned to oxazolinium. This confirmed that the polymer contained an oxazolinium ion structure.

This polymer was named compatibilizing agent G.

Synthesis Example 5 of Compatibilizing Agent

In a flask equipped with a stirrer, an inlet pipe for $N_2$ gas, a reflux condenser and a thermometer were charged 250 parts of toluene having dissolved therein 5 parts of vinyloxazoline and 95 parts of styrene. Further, 10 parts of benzoyl peroxide were added. While blowing $N_2$ gas therein, the reaction mixture was heated to 80 to 100° C. and stirred in this state for 5 hours for polymerization. After cooling the mixture down to room temperature and removing the solvent by evaporation, the reaction mixture was poured into 500 ml of methanol to solidify the product, followed by drying to obtain a polymer having an oxazoline group as a functional group (weight average molecular weight: 39,000). This polymer (100 parts) was dissolved in 30 parts of benzene. To the resulting solution were added 5 parts of methyl chloride, 1 part of sodium iodide, and the mixture was reacted under reflux for 12 hours. The reaction mixture thus obtained was poured into 1,000 parts of methanol for reprecipitating the product, followed by drying. The polymer thus obtained was measured for ultraviolet-visible light spectra in the same manner as in Synthesis Example 4 above and as a result absorption was obtained at UVmax=310 nm which is deemed to be assigned to oxazolinium. This confirmed that the polymer obtained contained an oxazolinium ion structure.

This polymer was named as compatibilizing agent H.

EXAMPLE 1

A 30% benzene solution of polystyrene (weight average molecular weight: 50,000) and a 30% benzene solution of polycarbonate (Taflon 2200 produced by Idemitsu Petrochemical Co., Ltd.) in amount of 10 ml, respectively, were charged in a test tube (diameter: 1.4 cm, length: 21 cm) with a stopper. After shaking the test tube sufficiently by hand, states of phase separation were observed after varied standing time.

The length of a transparent lower phase (polycarbonate) was used as an index of phase separation. That is, the larger the length of the lower phase, the more easily phase separation occurs. Table 4 shows the results obtained. The amount of the compatibilizing agent used is expressed in terms of weight percent based on the weight of polycarbonate.

From the results shown in Table 4, it can be seen that the compatibilizing agent of the invention is effective for compatibilizing polystyrene with polycarbonate.

TABLE 4

|  |  | Invention | | | Comparison | |
| --- | --- | --- | --- | --- | --- | --- |
|  |  | Experiment 1 | Experiment 2 | Experiment 3 | Experiment 4 | Experiment 5 |
| Compatibilizing Agent | | | | | | |
| Type | | A | B | G | — | Block Copolymer (1) |
| Amount (%) | | 10 | 10 | 10 | — | 10 |
| Degree of Phase Separation (cm) | | | | | | |
| Standing | 10 | 0 | 0 | 0 | 2.0 | 1.8 |
| Time (hrs) | 30 | 0 | 0.2 | 0.3 | 2.0 | 2.0 |
|  | 50 | 0 | 0.3 | 0.3 | 2.0 | 2.0 |
|  | 70 | 0 | 0.3 | 0.5 | 2.0 | 2.0 |
|  | 240 | 0.2 | 0.3 | 0.5 | 2.0 | 2.0 |

Note:
(1) Block copolymer used as the starting material in Synthesis Example 1 of a compatibilizing agent.

EXAMPLE 2

A 20% chloroform solution of atactic polypropylene (Sunattack produced by Chiba Fine Chemicals Co., Ltd.) and a 30% chloroform solution of modified PPO (polyphenyleneoxide, Nolyl resin produced by General Electrics Co.) in amounts of 10 ml, respectively, were charged in a test tube with a stopper, and states of phase separation after shaking were observed in the same manner as in Example 1.

The length of a transparent lower phase (PPO) was used as an index of phase separation. The amount of the compatibilizing agent used is expressed in terms of weight fraction based on the modified PPO. Table 5 shows the results obtained.

From the results shown in Table 5, it can be seen that the compatibilizing agent of the invention is effective for compatibilizing modified PPO with polypropylene.

TABLE 5

|  |  | Invention | | | | | Comparison | |
| --- | --- | --- | --- | --- | --- | --- | --- | --- |
|  |  | Experiment 6 | Experiment 7 | Experiment 8 | Experiment 9 | Experiment 10 | Experiment 11 | Experiment 12 |
| Compatibilizing Agent | | | | | | | | |
| Type | | C | D | E | F | H | — | Polyisobutylene (2) |
| Amount (%) | | 10 | 10 | 10 | 10 | 10 | — | 10 |
| Degree of Phase Separation (cm) | | | | | | | | |
| Standing | 10 | 0 | 0 | 0 | 0 | 0 | 1.5 | 1.7 |
| Time (hrs) | 30 | 0 | 0.3 | 0 | 0.5 | 0.2 | 1.7 | 1.7 |
|  | 70 | 0 | 0.5 | 0 | 0.7 | 0.4 | 1.7 | 1.7 |

TABLE 5-continued

|  | Invention | | | | | Comparison | |
|---|---|---|---|---|---|---|---|
|  | Experiment 6 | Experiment 7 | Experiment 8 | Experiment 9 | Experiment 10 | Experiment 11 | Experiment 12 |
| 240 | 0.3 | 0.5 | 0.5 | 1.0 | 0.7 | 1.7 | 1.7 |

Note:
(2) Block copolymer used as the starting material in Synthesis Example 2 of a compatibilizing agent.

EXAMPLE 3

Polystyrene (20 parts) and 80 parts of the polar polymer and compatibilizing agent (10% based on the weight of the polar polymer) described in Table 6 were melt-kneaded using an extruder to obtain pelletized polymer blend composition. The pellets thus obtained were press-molded to test pieces and their impact strength, tensile strength and elongation were measured. Table 6 shows the results obtained.

TABLE 6

|  | Invention | | | | | Comparison | |
|---|---|---|---|---|---|---|---|
|  | Experiment 13 | Experiment 14 | Experiment 15 | Experiment 16 | Experiment 17 | Experiment 18 | Experiment 19 |
| Polar Polymer | Nylon-66 | Nylon-66 | PBT | PBT | PBT | Nylon-66 | PBT |
| Compatibilizing Agent Type | A | B | A | B | G | Block co-polymer (3) | Block co-polymer (3) |
| Izod Impact Strength (notched) (kg · cm/cm) | 13.1 | 11.5 | 3.9 | 3.1 | 3.5 | 6.1 | 2.1 |
| Tensile Strength (kg/cm$^2$) | 470 | 475 | 450 | 460 | 440 | 470 | 450 |
| Elongation (%) | 45 | 38 | 34 | 30 | 31 | 35 | 18 |

Note:
(3) The same as (1) in Table 1.
PBT: Polybutylene terephthalate

What is claimed is:

1. A compatibilizing agent for improving the compatibility between different polymers which are poorly compatible with each other, comprising a polymer having at least one heterocyclic ring structure containing a $>C=N^{\oplus}<$ bond in the molecule.

2. The compatibilizing agent as claimed in claim 1, wherein said different polymers which are poorly compatible with each other are a combination of a polar polymer and a nonpolar polymer.

3. The compatibilizing agent as claimed in claim 1, wherein said different polymers which are poorly compatible with each other are a combination of polar polymers.

4. A polymer blend composition comprising different polymers which are poorly compatible with each other and said compatibilizing agent defined in claim 1.

5. The polymer blend composition of claim 4 wherein said different polymers which are poorly compatible with each other are a combination of a polar polymer and a non-polar polymer.

6. The polymer blend composition of claim 4 wherein said different polymers which are poorly compatible with each other are a combination of polar polymers.

7. The polymer blend composition of claim 4 wherein the content of the compatibilizing agent in the polymer blend is from 1 to 100 percent by weight based on the total weight of the blended polymers.

8. The polymer blend composition of claim 4 wherein the amount of the compatibilizing agent in the polymer blend is from 5 to 30 percent by weight, based on the total weight of the polymers blended.

9. The polymer blend composition of claim 4 wherein the compatibilizing agent is a polymer having a ratio of (weight average molecular weight)/(number of heterocyclic rings in the polymer molecule) of from about 1,000 to about 100,000.

* * * * *